US012669674B2

(12) United States Patent
Yeon et al.

(10) Patent No.: US 12,669,674 B2
(45) Date of Patent: Jun. 30, 2026

(54) HYBRID ACTUATOR FOR ZOOM DRIVING

(71) Applicant: JAHWA electronics Co., Ltd.,
Chungcheongbuk-do (KR)

(72) Inventors: Je Seung Yeon, Chungcheongbuk-do
(KR); In Su Kang,
Chungcheongbuk-do (KR); **Hyeon Ik
Cho, Daegu (KR); Jae Seon Lee**,
Chungcheongbuk-do (KR)

(73) Assignee: JAHWA electronics Co., Ltd.,
Chungcheongbuk-do (KR)

( * ) Notice: Subject to any disclaimer, the term of this
patent is extended or adjusted under 35
U.S.C. 154(b) by 284 days.

(21) Appl. No.: 18/294,615

(22) PCT Filed: Jul. 4, 2022

(86) PCT No.: PCT/KR2022/009576
§ 371 (c)(1),
(2) Date: Feb. 2, 2024

(87) PCT Pub. No.: WO2023/022366
PCT Pub. Date: Feb. 23, 2023

(65) Prior Publication Data
US 2024/0345360 A1 Oct. 17, 2024

(30) Foreign Application Priority Data
Aug. 17, 2021 (KR) ........................ 10-2021-0107814

(51) Int. Cl.
*G02B 7/10* (2021.01)
(52) U.S. Cl.
CPC .................................. *G02B 7/102* (2013.01)
(58) Field of Classification Search
CPC ....................................................... G02B 7/102

USPC .......................................................... 359/824
See application file for complete search history.

(56) References Cited

U.S. PATENT DOCUMENTS

2021/0199983 A1 7/2021 Kazuo

FOREIGN PATENT DOCUMENTS

| JP | 2021-107854 A | 7/2021 | |
| KR | 10-2010-0113328 A | 10/2010 | |
| KR | 10-2018-0012150 A | 2/2018 | |
| KR | 10-2019-0128279 A | 11/2019 | |
| KR | 20190128279 A | * 11/2019 | ........... G02B 13/009 |

(Continued)

OTHER PUBLICATIONS

International Search Report for PCT/KR2022/009576 mailed on
Oct. 11, 2022.

(Continued)

*Primary Examiner* — William Choi
(74) *Attorney, Agent, or Firm* — The PL Law Group,
PLLC

(57) ABSTRACT

A hybrid zoom drive actuator includes a first carrier having
a first lens attached thereto, a second carrier located anterior
or posterior to the first carrier along the optical axis and
having a second lens attached thereto, a housing enclosing
the first and second carriers, a first driving unit capable of
moving the first carrier along the optical axis, a driving
magnet attached to the second carrier, a driving coil facing
the driving magnet and capable of providing driving force to
move the second carrier along the optical axis, a Hall sensor
capable of detecting the position of the second carrier, and
a first circuit board equipped with the driving coil and the
Hall sensor.

7 Claims, 8 Drawing Sheets

(56) References Cited

FOREIGN PATENT DOCUMENTS

| | | | |
|---|---|---|---|
| KR | 10-2020-0035522 A | 4/2020 | |
| KR | 10-2020-0126873 A | 11/2020 | |
| KR | 10-2021-0026212 A | 3/2021 | |

OTHER PUBLICATIONS

Office action issued on Mar. 13, 2025 from Korean Patent Office in a counterpart Korean Patent Application No. 10-2021-0107814 (all the cited references are listed in this IDS.) (English translation is also submitted herewith.).
Office action issued on Mar. 16, 2026 from China Patent Office in a counterpart China Patent Application No. 202280053674.0 (all the cited references are listed in this IDS.) (English translation is also submitted herewith.).

* cited by examiner

HYBRID ACTUATOR FOR ZOOM DRIVING

PRIORITY

This application claims benefit under 35 U.S.C. 119, 120, 121, or 365(c), and is a National Stage entry from International Application No. PCT/KR2022/009576, filed Jul. 4, 2022, which claims priority to the benefit of Korean Patent Application No. 10-2021-0107814 filed on Aug. 17, 2021, in the Korean Intellectual Property Office, the entire contents of which are incorporated herein by reference.

BACKGROUND

1. Technical Field

The present disclosure relates to a zoom drive actuator. More particularly, the present disclosure relates to a hybrid zoom drive actuator capable of reliably enhancing driving performance over extended strokes of lenses through the use of dual driving sources.

2. Background Art

Advances in hardware technology for image processing and growing consumer need for making and taking photos and videos have driven implementation of such functions as autofocusing (AF) and optical image stabilization (OIS) in stand-alone cameras as well as camera modules mounted on mobile terminals including cellular phones and smartphones.

Recent years have seen actuators for zoom lens that supports variable adjustment features including the object size by tuning the focal length through such functions as zoom-in and zoom-out. In certain models of actuators, further diversification in implementing zoom has been attainable going far beyond autofocusing through combinations in the relative positions among plural lenses (lens assembly).

Since zoom lenses have longer or extended distances of movement along the optical axis (also referred to as stroke) than ordinary lenses, the actuators used for driving zoom lens must accordingly be designed to attain sufficient driving force and improved time response characteristics.

Actuator design known in the art, however, assigned each of the plural carriers an independent room for movement, and this caused commensurate impairment to space utilization, leading to inflated actuator dimensions. This complicated the use of prior art actuators in applications such as smart phones where thickness or size was a significant issue.

In addition, art-known actuators include as many driving units as the carriers to drive the carriers, and since individual driving units relied on the magnetic or electromagnetic force between the coils and the magnets, magnetic field interference between the driving units that were supposed to operate independent to one another has been a concern. As art-known actuators addressed this magnetic field interference issue by keeping the driving units apart from one another, this further afflicted spatial efficiency.

Moreover, the use of magnetic force from the coils and the magnets as driving force necessitates expanded dimensions in these coils and magnets, which in turn calls for complex and elaborate architecture capable of avoiding magnetic field interference to attain spatial efficiency. This has led to poor efficiency in production or assembly as well.

SUMMARY

The present disclosure has been contemplated to solve the aforementioned problems of the related art in the context mentioned above. It is a technical goal of the present invention to provide a hybrid zoom drive actuator that not only has improved precision in driving performance and augmented driving force for zooming and autofocusing but also achieves a more effective utilization of space.

Other technical goals and advantages of the present invention can be understood with reference to the description below, which will be made explicit by the accompanied examples. Furthermore, the technical goals and advantages of the present invention can be accomplished by the embodiments and their combinations recited in the attached claims.

To achieve the technical goals mentioned above, in one aspect of the present disclosure is provided a hybrid zoom drive actuator including a first carrier having a first lens attached thereto: a second carrier located anterior or posterior to the first carrier along the optical axis and having a second lens attached thereto; a housing enclosing the first and second carriers: a first driving unit capable of moving the first carrier along the optical axis: a driving magnet attached to the second carrier; a driving coil facing the driving magnet and capable of providing driving force to move the second carrier along the optical axis: a Hall sensor capable of detecting the position of the second carrier; and a first circuit board equipped with the driving coil and the Hall sensor.

In a preferable embodiment, the first circuit board is mounted on the first carrier to move along the optical axis with the first carrier.

Preferably, the actuator of the present invention further includes an operating drive capable of applying to the driving coil power with a magnitude and a direction in response to the signal from the Hall sensor, where the operating drive, upon movement of the first carrier, controls the movement of the second carrier, with this control made in response to the magnitude and direction of the movement of the first carrier.

In addition, the second carrier of the present disclosure may be placed within the moving space provided by the first carrier, while the first carrier includes a stopper structure to delimit the scope of movement for the second carrier.

Furthermore, the second carrier of the present invention may include a second mount equipped with the second lens; and a second support fitted on the second mount, either to its left or right, equipped with the driving magnet, where the second support extends longer along the optical axis than the second mount.

Moreover, the first carrier of the present invention may include a first mount equipped with the first lens: a first support fitted on the first mount, either to its left or right, and having a first reception member to provide the moving space for the second support with the first support being equipped on the exterior thereof with the first circuit board; and a first guide formed on a side of the first mount, either the left or right thereof, but opposite the side the first support is fitted thereon, wherein either the first support or the first guide is physically connected to the first driving unit.

Preferably, the first support of the present invention extends along the optical axis longer than the first mount, but in a direction running opposite to that of the second support.

In certain embodiments, the second carrier of the present invention further includes a second guide formed on a side of the second mount, either the left or right thereof, but opposite the side the second support is fitted thereon, in which case the first guide of the first carrier is configured to include a second reception member to provide the moving space for the second guide.

Preferably, the first carrier of the present invention disclosure includes a first guide rail formed on the first support and facing a first concave rail formed on the second support; and a second guide rail formed on the first guide and facing a second concave rail formed on the second guide, while the one out of the first support and the first guide that is not physically connected to the first driving unit may further include a grooved rail facing a guide rail formed on the housing. In such case, the present invention may further include a plurality of balls in which at least one of said plurality of balls is positioned between the guide rail and the grooved rail; between the first guide rail and the first concave rail; and between the second guide rail and the second concave rail.

According to an embodiment of the present disclosure, a physical arrangement of plural carriers in symmetrically opposing directions not only affords sufficient scope for independent movement for each lens (lens assembly) attached to each carrier, but also enables implementing the entire device in a spatially more compact structure and shape, providing a device design optimal for minimizing the overall space and thereby slimming the mobile terminal.

According to a preferred embodiment of the present disclosure, space for harnessing the magnet is provided in such way that the carriers are asymmetrically arranged with reference to the lens attachment to allow each carrier to mount a magnet of a sufficient size, effectively fortifying the driving force.

According to another embodiment of the present disclosure, application of driving force e.g., from a motor to some of the plural carriers and of magnetic force between the coils and magnets to the rest not only obviates the need for further design to get around magnetic interferences and disturbances but also provide driving force strengthened even further through e.g., driving by motor.

Furthermore, the design of the present invention in which elements for controlling the movements of other carriers such as coils and detection sensors are set up within a carrier to move together in a motion driven e.g., by a motor, provides a platform to precisely maintain adequate distances among the plurality of carriers via suitable control processing. This affords enhanced precision in zoom and autofocus functions as well as improvement in time response characteristics.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
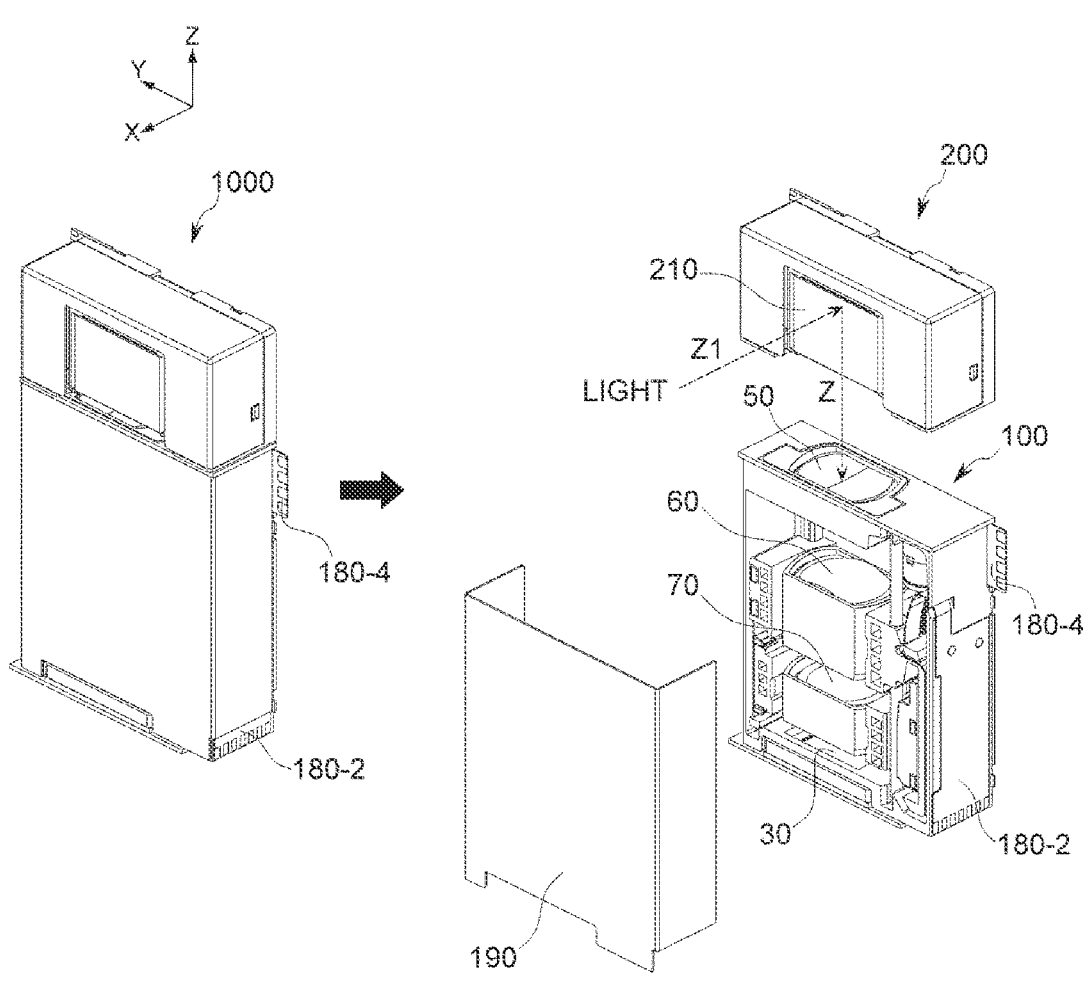
FIG. 1 is a diagram depicting the overall configuration of an actuator and a camera module in accordance with a preferred embodiment of the present invention.

FIG. 1 depicts the overall configuration of a zoom drive actuator (hereinafter referred to simply as "actuator") (100) and a camera module (1000) in accordance with a preferred embodiment of the present invention.

The actuator (100) of the present invention can be embodied along with such other parts as a reflectometer module (200) as part of a camera module (1000) as illustrated in FIG. 1, not to mention as a single stand-alone device.

As will be described in detail below, the actuator (100) of the present invention is for carrying out autofocusing or zooming by moving in a linear motion each of a plurality of carriers to which the lens (lens assembly) is attached along the optical axis.

The reflectometer module (200), which can be set up forward or anterior to (along the optical axis) the actuator (100) of the present invention, reflects or refracts the optical path (Z1) of the object towards a path in the direction of the lens (Z). The light thus reflected or refracted towards the optical axis passes the lens (lens assembly) mounted on the carrier and enters the image sensor such as complementary metal oxide semiconductor (CMOS) and charge coupled device (CCD).

The reflectometer module (200) for modifying the optical path may include a reflectometer (210) that consists of one selected from a mirror and a prism or a combination of both. The reflectometer (210) may be included of any material capable of modifying the path of the incoming light from the outside toward the optical axis, but for the purpose of high performance optical properties, glass is the preferred medium.

The camera module (1000) of the present invention including such elements as the reflectometer module (200) is configured to refract the path of light toward the lens. This allows the entire device to be set up lengthwise along the mobile terminal instead of across the width so as to keep the mobile terminal thin, making it optimal for miniaturization and slimming of mobile terminals.

In certain embodiments, the reflectometer (210) is configured to move in rotational motion by the action of a driving means capable of generating magnetic field such as magnets and coil. Thus, as the reflectometer (210) moves or moves in rotational motion, the light from the object reflected (refracted) by the reflectometer (210) is led along the ±Y-axis and/or ±X-axis to enter the lens and image pick-up element, thereby enabling corrections to camera shake along the X-axis and/or Y-axis.

The light from the object thus reflected by the reflecto-meter module (200) enters into the first lens (first lens assembly, first lens barrel) (60) and second lens (second lens assembly, second lens barrel) (70) equipped within the actuator (100), and functions such as zooming and autofo-cusing are performed by the actuator (100) of the present invention making combinatorial adjustments to the positions for each of the first (60) and second (70) lenses along the optical axis.

In certain embodiments, a fixed lens (50) can be set up anterior (along the optical axis) to the actuator (100) as illustrated in FIG. 1 to enhance optical performances such as actuator (100) zoom ratio.

As described hereinafter, the optical axis (Z-axis) is defined as the axis corresponding to the path of the incoming light, e.g., into the first lens (60) and the two axes spanning a plane perpendicular to the optical axis (Z-axis) are defined as the X-axis and Y-axis.

The fourth circuit board (180-4) illustrated in FIG. 1 is a circuit board in electrical connection with the first driving unit (170) of the present invention. The second circuit board (180-2) is a circuit board in connection with the first circuit board (180-1) of the present invention equipped with a driving coil (C) and a Hall sensor (H) through the medium of an interface (180-3) made out of an elastic and flexible material.

The second (180-2) and fourth (180-4) circuit boards preferably have parts exposed externally as illustrated to serve as an interface for power connection to and processing of data signals from external devices (e.g., the main board of a smartphone).

Figure 2:
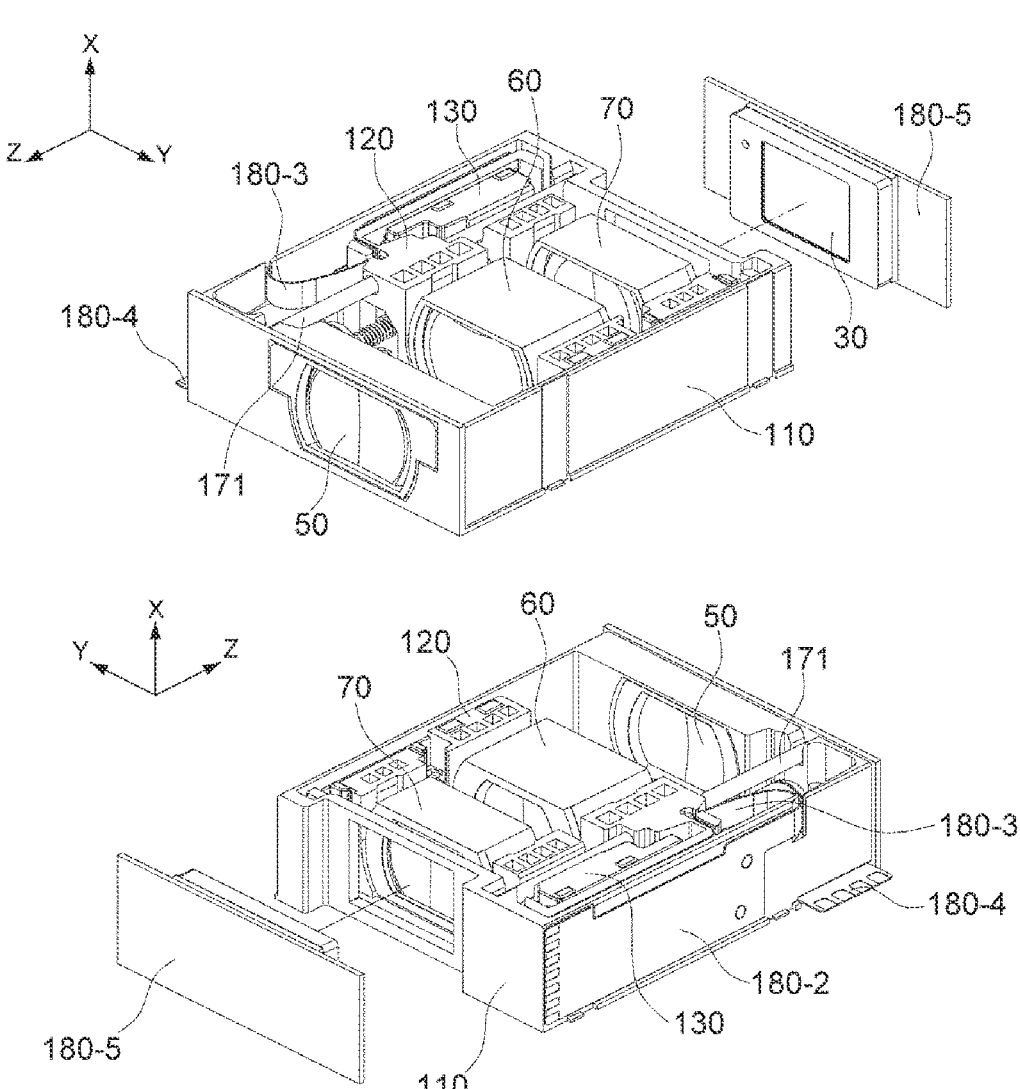
FIG. 2 is a diagram depicting the overall configuration of an actuator in accordance with a preferred embodiment of the present invention.

FIG. 2 illustrates the overall configuration of an actuator (100) in accordance with a preferred embodiment of the present invention.

The actuator (100) of the present invention includes a housing (110), which amounts to the base frame accommo-dating the inner parts, a casing (190, refer to FIG. 1) attached to the housing (110) and capable of functioning as a shield can, a first carrier (120) and a second carrier (130).

Each of the first carrier (120) with a first lens (60) attached thereto and the second carrier (130) with a second lens (70) attached thereto amounts to a moving body in linear motion along the optical axis (Z-axis), while correspondingly the housing (110) amounts to a fixed body.

Although the second carrier (130) may be located either anterior or posterior to the first carrier (120) along the optical axis, the description hereinafter will be based on an embodi-ment illustrated in FIG. 2 and the like, in which the second carrier (130) is placed posterior to the first carrier (120) along the optical axis.

The first driving unit (170) of the present invention is an element that sets the first carrier (120) in a linear motion along the optical axis. As long as it can move the carrier (120) in a certain direction by means of an external control signal or a signal detection system, the first driving unit can be embodied in diverse forms such as shape memory alloys, piezoelectric material and micro-electromechanical systems (MEMS).

However, to improve movement efficiency of the first carrier (120) whose range of movement needs to be expanded, the first driving unit (170) can be implemented in the form of a motor drive (170) that converts rotational force into linear driving force. For the purpose of illustration, the description hereinafter will be based on an embodiment in which a motor drive is the first driving unit.

As will be described below, the first carrier (120) is configured to move along the optical axis in physical con-nection with the motor drive (170), and it may be configured to move along a shaft (171) as illustrated in the drawings for the purpose of precision in and physical support to linear movement.

Figure 5:
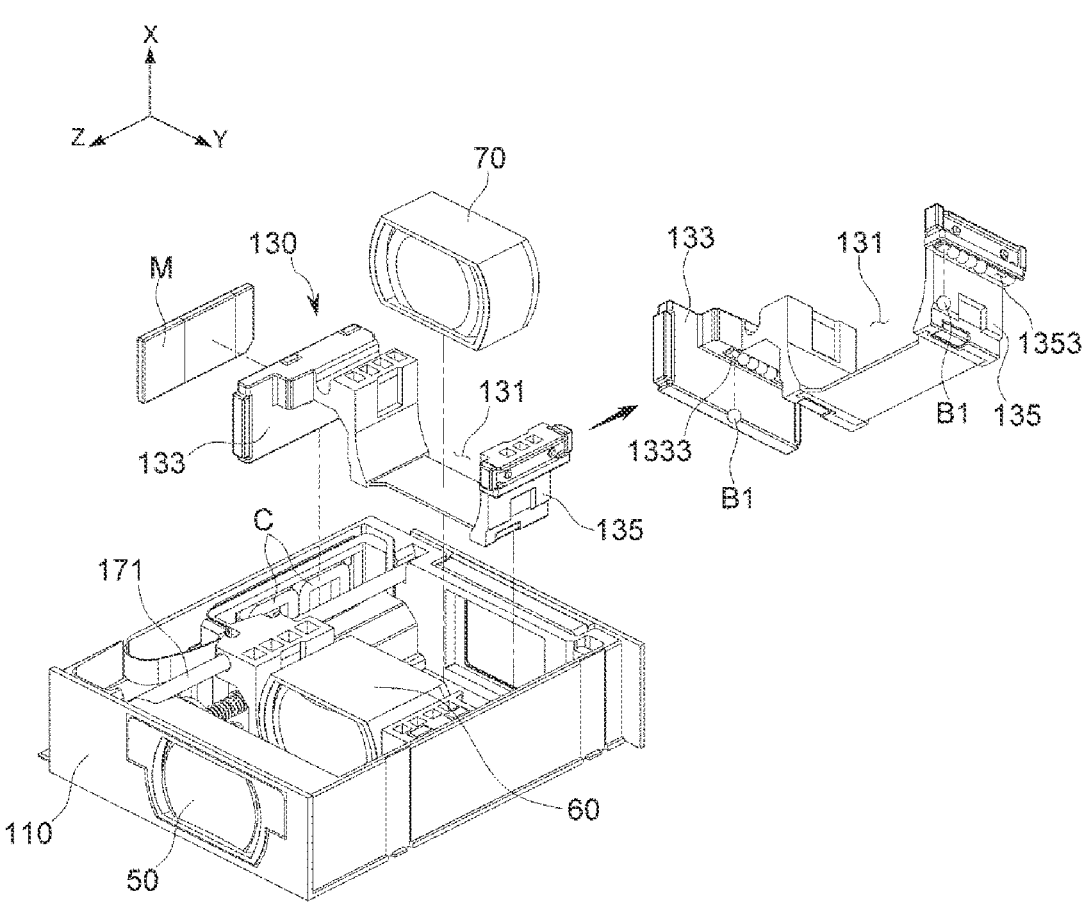
FIG. 5 is a diagram depicting the configuration in detail of the second carrier and other elements according to an embodiment of the present invention.

The second carrier (130), to which a second lens (70) is attached, is equipped with a driving magnet (M, see FIG. 5). A driving coil (C, see FIG. 3) is placed at a location facing this driving magnet (M).

When control by the operating drive (H) results in appli-cation of power of proper magnitude and direction across the driving coil (C), magnetic force is generated between the driving coil (C) and the driving magnet (M), and it is this magnetic driving force that moves the second carrier (130) along the optical axis.

In certain embodiments, the actuator may further include a detection sensor for detecting information on the second carrier (130) such as position. In such case, upon detecting the second carrier (130) e.g., its position, the detection sensor sends a corresponding signal to the operating drive (H), it controls application of power of a magnitude and a direction responsive to this signal towards the driving coil (C).

The detection sensors may be implemented as Hall sen-sors which through the Hall effect, detect the magnitude and the direction of magnetic field generated from magnets present within the region of detection to generate an output a signal corresponding to the field.

Thus, when Hall sensors are implemented as detection sensors, a Hall sensor (H) detects the magnitude and direc-tion of magnetic field from the driving magnet (M) attached to the second carrier (130) and outputs an electric signal based on the magnetic field.

Hall sensor (H) detection and control processing on the operating drive are preferably cyclically applied by feedback control so as to achieve improved driving precision through continuous, time series control.

Needless to say, the operating drive can be embodied as a single stand-alone device or a circuit element. Generally, however, the operating drive is embodied as an integrated chip with Hall sensors through such means as system-on-chip (SOC). Accordingly, the same reference character (H) is assigned to both the Hall sensor and the operating drive in the drawings.

In addition, the operating drive may be implemented as a single chip together with the Hall sensors with as many operating drives as the individual Hall sensors (the same number as the coils). In other embodiments, for the purpose of coordinating the number of channels electrically connect-ing the operating drive with the Hall sensors, the number of operating drives may differ from that of the Hall sensors, and the operating drive may as well be implemented as a single chip with only part of the individual Hall sensors.

The actuator (100) of the present invention individually drives a plurality of carriers in which some of them are driven mechanically by the motor drive (170), and the others are driven by electromagnetic force between the coils and the magnets.

Compared to art-known actuators where all of the plural carriers are driven with electromagnetic fields, the actuator (100) of the present invention is capable of eliminating from the beginning factors harmful to precision driving such as magnetic field interference and disturbances. This not only promotes precision driving but also allows to simultaneously obtain sufficient moving range for zoom driving and augmentation in driving force.

It is preferred that the carriers are designed to suit the particular embodiment such that carriers associated with relatively long moving distances such as zoom driving are driven by the motor drive (170) and carriers associated with relatively short distances such as autofocusing are driven by electromagnetic force.

Although the accompanying figures illustrate an embodiment in which a first carrier (120) to which a first lens (60) is attached as well as a second carrier (130) to which a second lens (70) is attached are present, this is only one of the possible examples. Needless to say, further numbers of lenses and carriers can be included depending on the particular embodiment.

Hereinafter, for the purposes of efficient description, the number of carriers illustrated as being included in an actuator (100) will be two in the examples, and in addition, the carrier placed anterior along the optical axis shown in FIG. 2 will be designated as the first carrier (120), while the carrier placed posteriorly as the second carrier (130).

Thus, as each of the first carrier (120) and the second carrier (130) moves linearly along the optical axis, so does each lens (lens assembly) attached to each carrier, and through the relative positioning of these lenses, zooming or auto-focusing is implemented.

As explained above, by the image sensor (30) is meant an image pick-up element such as charge-coupled device (CCD) and complementary metal oxide semiconductor (CMOS). In certain embodiments, the image sensor (30) can be placed at lower end (based on the optical axis) of the actuator (100) in the form of being packaged into the fifth circuit board (180-5) accompanied by a physical structure such as a holder.

Figure 3:
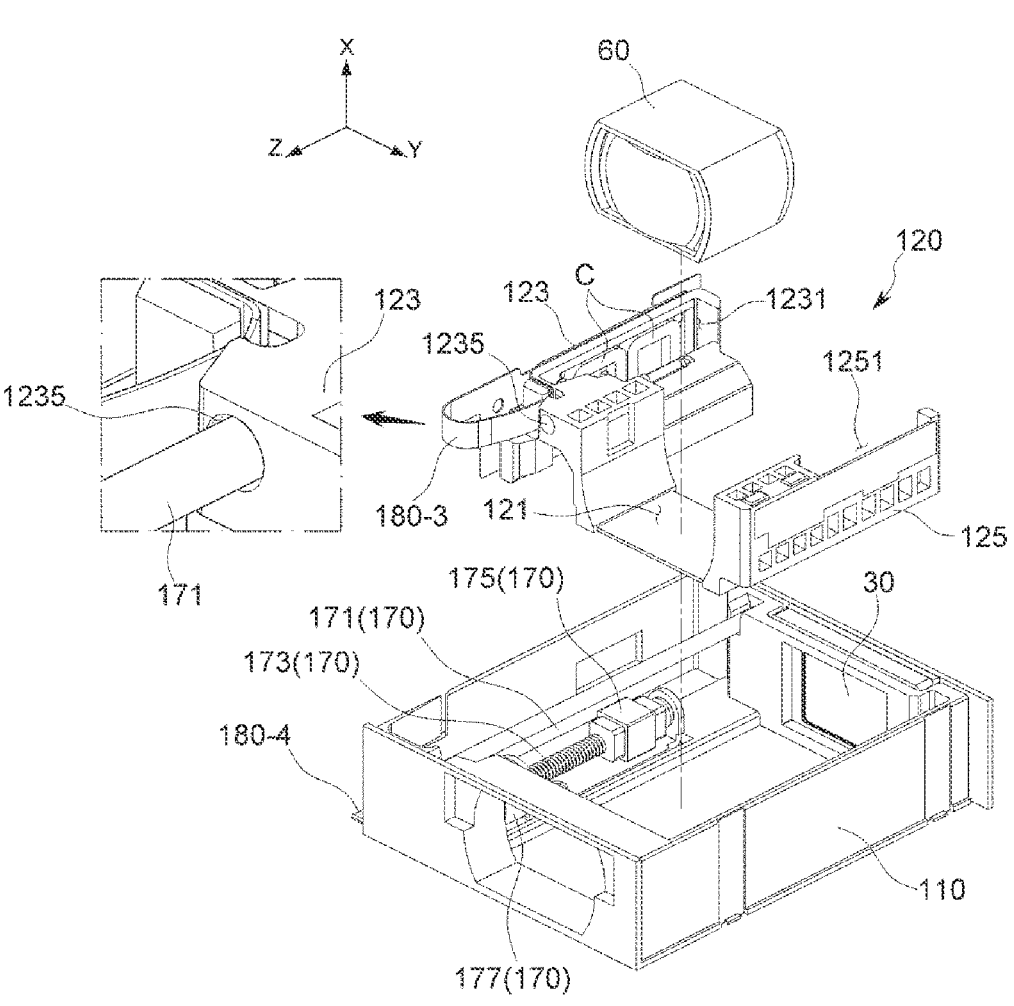
FIG. 3 and FIG. 4 depict the configuration in detail of the first carrier and other elements according to an embodiment of the present invention.
Figure 4:
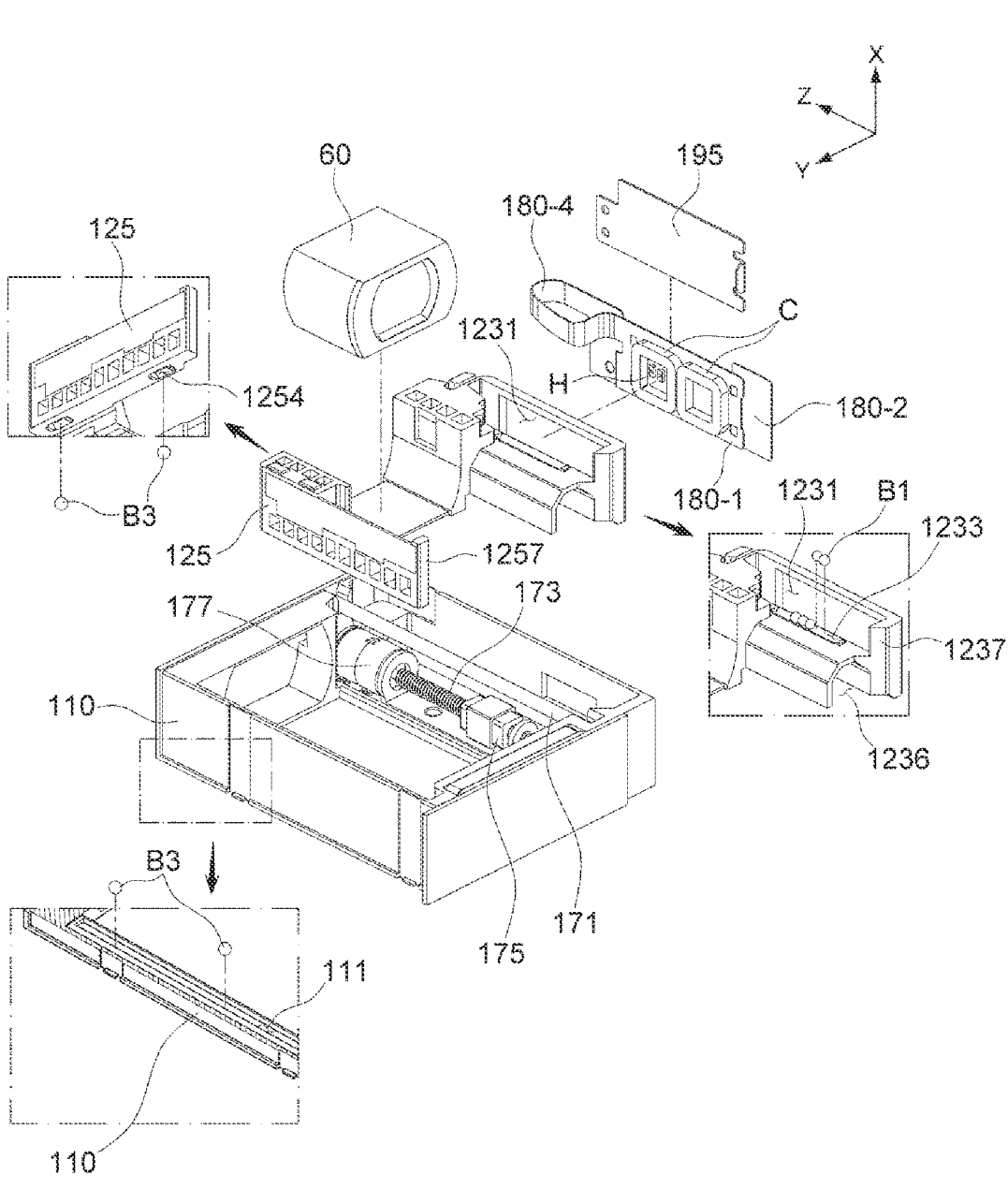

FIGS. 3 and 4 illustrate a configuration in detail including a first carrier (120) and others in accordance with an embodiment of the present invention.

As described above, the first carrier (120) of the present invention to which the first lens (60) is attached is a moving body in linear motion along the optical axis. More particularly, the first carrier (120) includes a first mount (121) equipped with the first lens (60), a first support (123) and a first guide (125).

The first mount (121) as illustrated in the drawings, is shaped to match that of the first lens (60) so that it can mount the lens. In certain embodiments, a casing or a stopper (not shown) can be provided in the upper part (based on the X-axis) of the first mount (121) to prevent the first lens (60) from being dislocated, e.g., along the X-axis.

The first support (123) includes the first reception member (1231) that provides, as will be described later, the moving space for the second support (133) of the second carrier (130). The driving magnet (M) is equipped on the second support (133) of the second carrier (130).

The first support (123) is fitted on the first mount (121) either to its left or right, and preferably extends, as illustrated in the figures, along the optical axis longer than the first mount (121).

The first support (123) may be made integral with the first mount (121), and for the purpose of forming a physical structure symmetric with the second support (133) of the second carrier (130), which is to be described later, the first support (123) preferably has a shape extending along one of the optical axes (Z-axis).

The first circuit board (180-1) is a circuit board on which a driving coil (C) and a Hall sensor are equipped. The first circuit board (180-1) is mounted on the first carrier (120), more specifically on the exterior of the first support (123). As illustrated in FIG. 4, a yoke (195) may be set up on the exterior of the first circuit board (180-1) in order to focus the magnetic force generated from the driving coil (C) toward the driving magnet (M).

The first guide (125) is an element that guides the linear movement of the first carrier (120) to be conducted more stably and smoothly. With reference to the first mount (121), the first guide (125) and the first support (123) are placed on opposite sides. In certain embodiments, the first guide (125) may include the second reception member (1251) that provides the movement space for the second guide (135) of the second carrier (130).

The motor drive (170) is an element that drives the first carrier (120) along the optical axis. More particularly, the motor drive (170) may include a motor (177) that imparts rotational power and an axis member (173) rotating in conjunction with the motor (177) and around which screw thread is formed.

In addition, the motor drive (170) is physically connected, e.g., through the screw thread formed inside it, to the axis member (173) and may include a moving intermediate member (175) that connects the motor drive (170) to either the first support (123) or the first guide (125). An embodiment is illustrated in the drawings, where this moving intermediate member (175) is connected to the first support (123) via a connecting member (1236).

The moving intermediate member (175) is physically connected to the first support (123) but in a way that prevents it from rotating. Therefore, when the axis member (173) is made to rotate by the rotating motor (177), the moving intermediate member (175) starts to move up and down the screw thread of the axis member (173), which in turn sets the first support (123), i.e., the first carrier (120) moving up and down the optical axis.

In such case, the first support (123) is physically supported and guided by a shaft (171) by means of e.g., a through-hole (1235) or a rail structure so as to maintain the linearity of the first carrier's (120) movement along the optical axis.

To relieve physical load between the shaft (171) and the through-hole (1235), the through-hole (1235) may have part of its cross-section (through the XY-plane) form a line. In particular, the anterior cross-section of the shaft (171) may form a line when the attractive force by the yoke and the like acts on the first carrier (120) towards the bottom (based on the x-axis). Such design is capable of reducing frictional resistance by making the contact surface between the shaft (171) and the through-hole (1235) a line.

Furthermore, in certain embodiments, expanding the region of physical guidance from the shaft (171) either through lengthening the through-hole (1235) moving along the shaft (171) or installing through-holes (1235) at multiple locations allows tilting and shaking on the part of the second carrier (130) to be minimized, leading to a more effective linear movement of the second carrier (130).

As previously described, the first circuit board (180-1) equipped with a driving coil (C) and a Hall sensor (H) and being mounted on the first carrier (120), more specifically on the first support (1223), moves along with the first carrier (120) along the optical axis when the first carrier (120) is in motion.

The Hall sensor (H) is an element that detects the magnetic field of the driving magnet (M) and outputs an electric signal in response. Thus, the output signal from the Hall sensor (H) varies when the driving magnet (M) moves relative to the Hall sensor (H) and vice versa.

Thus, in a setting where the output of the Hall sensor is assigned the default value, feedback control still becomes available even when the Hall sensor (H) is displaced by movement of the first carrier (120) to reassign the position of the second carrier (130) to which the driving magnet (M) is attached as the default position (or an equivalent position) by control processing through the operating drive (H) in which power of appropriate magnitude and direction is applied across the driving coil (C).

In the implementation of zoom driving, the plurality of lenses (the first and second lenses) are required to move together while maintaining an appropriate spacing. The present invention is capable of automated control processing by means of configurations described above to keep the second carrier (130) moving effortlessly with the first carrier (120) upon movement of the first carrier (120) without resorting to physically complex structures.

As previously described, the first support (123) of the first carrier (120) provides the moving space for the second support (133) of the second carrier (130) in the first reception member (1231), and the first guide (125) of the first carrier (120) provides the moving space for the second guide (135) of the second carrier (130) in the second reception member (1251).

Under the described structural relationship, the second carrier (130) of the present invention, by ensconcing itself in the first carrier (120), gets set up in the moving space provided by the first carrier (120).

In certain embodiments, stopper structures (1237, 1257), for example, in a shape that protrudes inward, can be placed at the ends of the first support (123) and the first guide (125) of the first carrier (120) so that the second carrier (130) is kept from physically dislocating from its track and led to move accompanying the first carrier (120) upon the first carrier's (120) movement while the second carrier's (130) moving range stays limited.

In addition, the element out of the first support (123) and the first guide (125) that is not physically connected to the motor drive (170)—the first guide (125)—may include, as illustrated in FIG. 4, a grooved rail (1254) facing the guide rail (111) formed on the housing (110).

By means of the third balls (B3) minimizing friction through their movement, rolling, point contact, etc., embodiments thus described allow the first carrier (120) to move in smooth linear motion, leading to reductions in noise and requisite driving force as well as improved driving precision.

Figure 6:
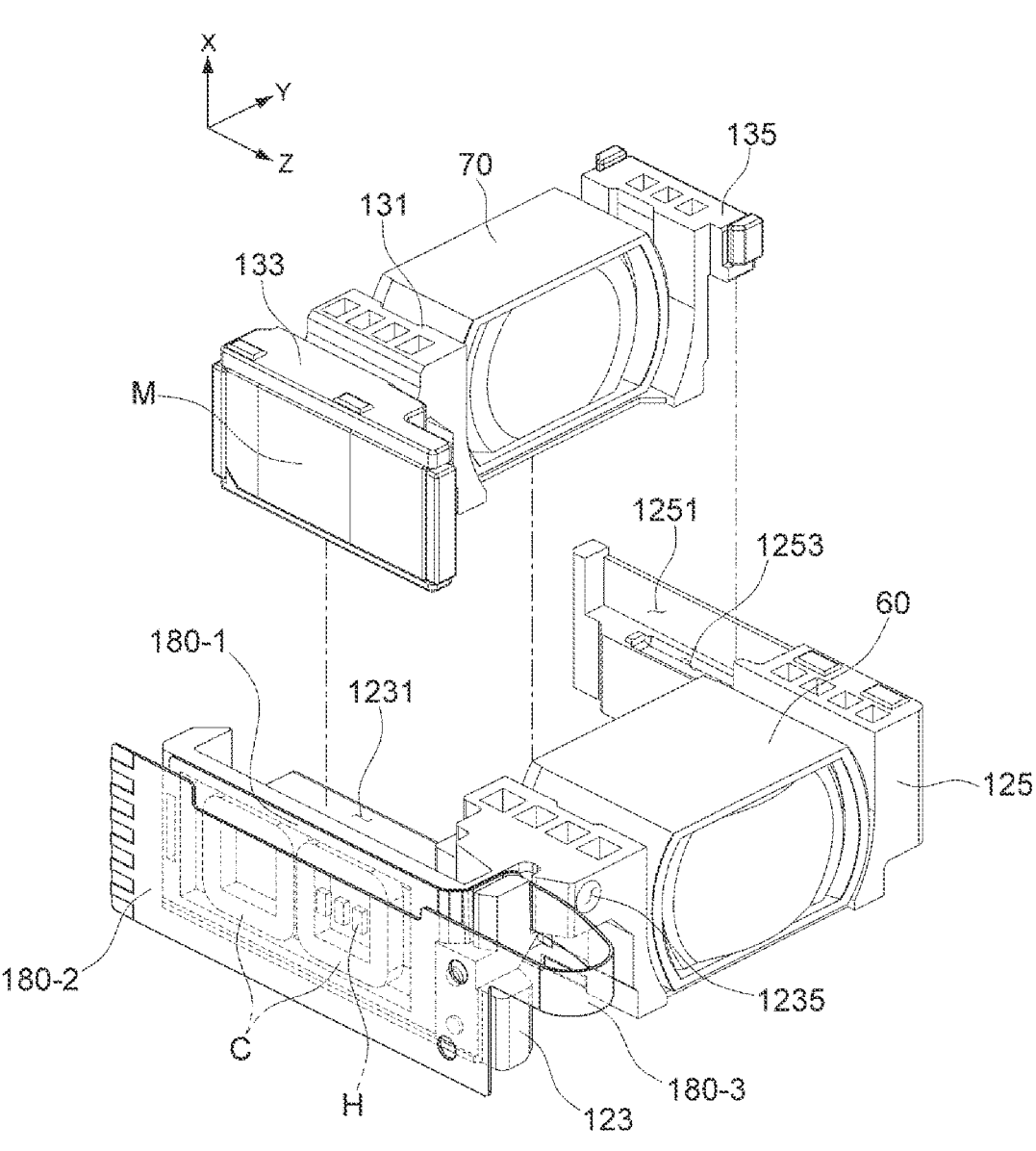
FIG. 6 depicts the relationship between the first and second carriers.

The first carrier (120) may include the first guide rail (1233) and the second guide rail (1253, see FIG. 6).

The first guide rail (1233) is formed on the first support (123) of the first carrier (120) and faces a first concave rail (1333, see FIG. 5) formed on the second support (133) of the second carrier (130).

The second guide rail (1253) is formed on the first guide (125) of the first carrier (120) and faces a second concave rail (1353) formed on the second guide (135) of the second carrier (130). At least one first ball (B1) may be positioned between the first guide rail (1233) and the first concave rail (1333) and at least one first ball (B1) may be positioned between the second guide rail (1253) and the second concave rail (1353).

In the drawings, the driving coil (C1) and the driving magnet (M) are shown to locate at a position matching that of the motor drive (170), but this is only an example. Needless to say, the elements generating the electromagnetic field driving the second carrier (130) may be placed left (right) (based on the Y-axis) and the motor drive placed right (left) depending on the particular embodiment.

FIG. 5 is a diagram depicting the configuration in detail of the second carrier (130) and other elements according to an embodiment of the present invention. FIG. 6 depicts the relationship between the elements including the first and second carriers (120, 130).

As illustrated in FIG. 5, the second carrier (130) of the present invention may include a second guide (135), a second support (133) and a second mount (131) that has grooves to match the shape of the second lens (70) so as to be able to carry it.

The second support (133) is fitted on the second mount (131), either left or right thereto, and extends longer along the optical axis than the second mount (131) and is equipped with a driving magnet (M) as previously described.

The second support (133) equipped with a driving magnet (M) is accommodated in the first reception member (1231), a space provided by the first support (123). Under such arrangement, the driving magnet (M) faces the driving coil (C) equipped to the first carrier (120).

The second guide (135) is an element that guides the linear movement of the second carrier (130) to be conducted more stably and smoothly. With reference to the second mount (131), the second guide (135) and the second support (133) are placed on opposite sides. In certain embodiments, the first guide (125) may include the second reception member (1251) that provides the movement space for the second guide (135) of the second carrier (130). The second guide (135) is accommodated by getting ensconced in the second reception member (1251) of the first guide (125).

As described above, on the second guide (135) is formed a second concave rail (1353) that face, past the interposing the first balls (B1), the second guide rail (1253) while on the second support (133) is formed a first concave rail (1333) that face, past the interposing the first balls (B1), the first guide rail (1233).

The second carrier (130) has a physical structure commensurate with the first carrier (120), and is formed symmetrically with respect to the first carrier (120) as shown in the drawings.

More particularly, the first support (123) of the first carrier (123) preferably has a shape extending further along the optical axis than the first mount (121) but in a direction opposite to that of the second support (133) of the second carrier (130).

Thus, sufficient room for moving the first (60) and second (70) lenses can be secured by keeping the overall physical structures of the first (120) and the second (130) carriers similar while positioning the first mount (121) equipped with the first lens (60) and the second mount (131) equipped with the second lens (70) at the respective middle parts of these carriers.

Furthermore, the set-up described above allows widening of the area in which driving magnets (M) and driving coils (C), required for driving the second carrier (130), are installed, helping to effectively enhance the driving force.

In certain embodiments, the rail structure guiding the movement of the first (B1), second (B2) and third (B3) balls can be implemented by having an inserted member of a metallic material for the first guide rail (1233) and the first concave rail (1333) guiding the first balls (B1) as well as for the second guide rail (1253) and the second concave rail (1353) guiding the second balls (B2).

Configuration as such can enhance and maintain the friction-reducing effect by improving properties of the contact surface with the balls and minimize damage from physical collision with the balls caused, e.g., by a fall, and any scattering of debris associated with it.

Figure 7:
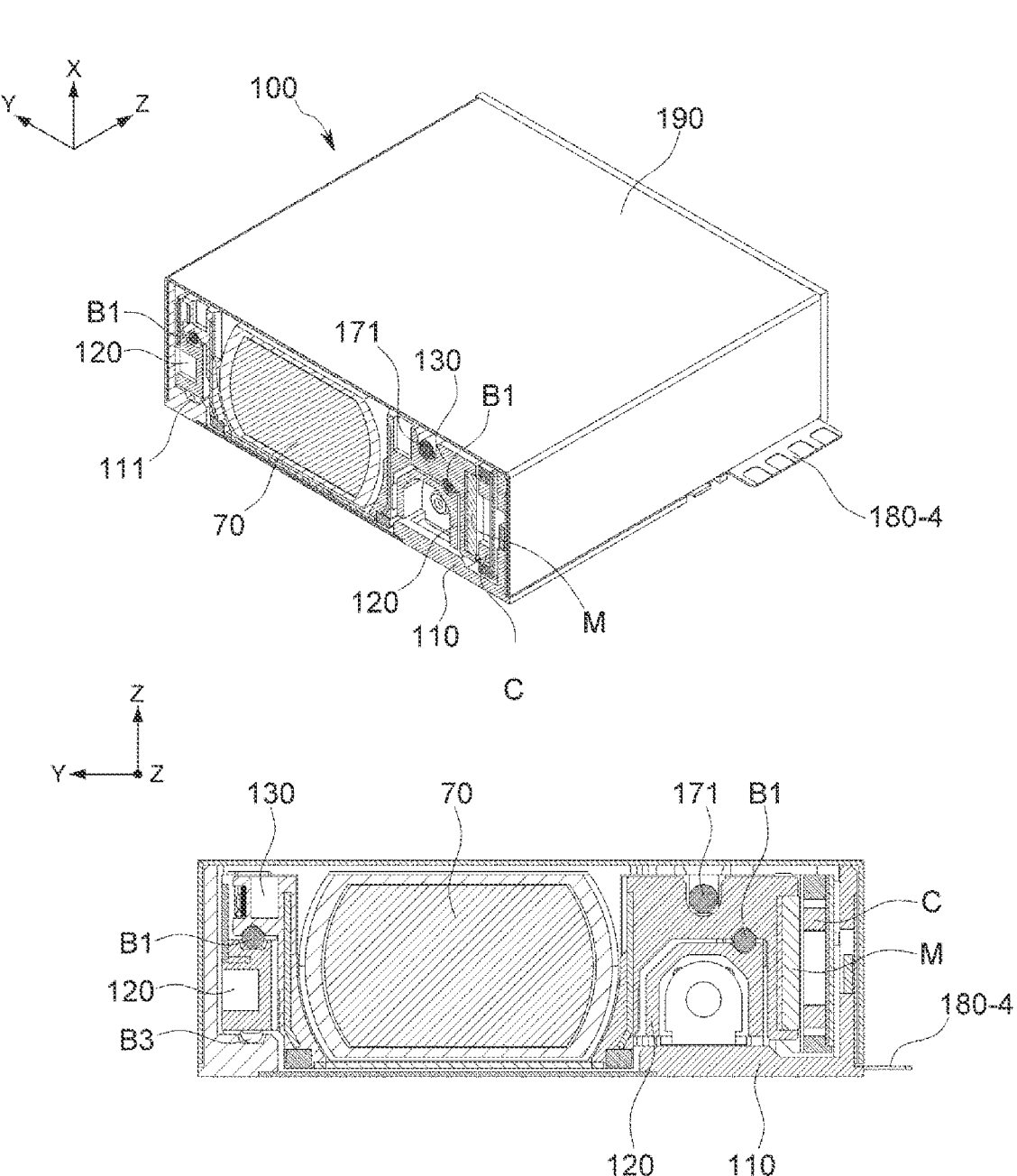
FIG. 7 is a cross-sectional view illustrating the configuration in detail of the actuator according to an embodiment of the present invention.
Figure 8:
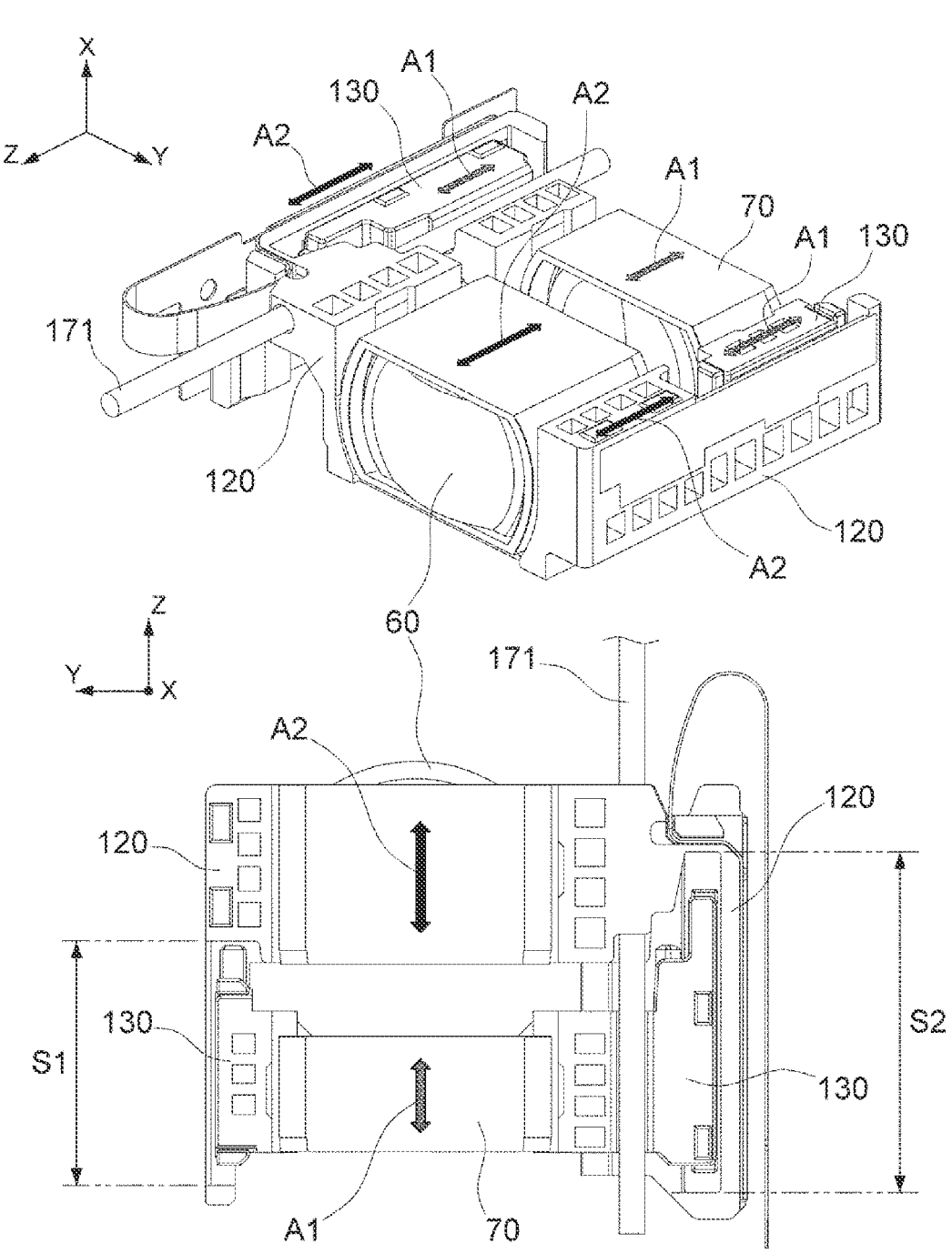
FIG. 8 illustrates the movement of each carrier according to an embodiment of the present invention.

FIG. 7 is a cross-sectional view illustrating the configuration in detail of the actuator according to an embodiment of the present invention. FIG. 8 illustrates the movement of each of the carriers (120, 130) according to an embodiment of the present invention.

As illustrated in drawings previously referred to and in FIG. 7, the second carrier (130) of the present invention is set up in the space provided the first carrier similar to that of the first reception member (1231) of the first support (123) and the second reception member (1251) of the first guide (125).

In certain embodiments, the second carrier (130) can be configured to move along the optical axis through physical support and guiding by the first balls (B1) placed respectively, between the first carrier (120) and the second carrier (130), more specifically between the first guide rail (1233) and the first concave rail (1333) of the first carrier (120) as well as between the second guide rail (1253) and the second concave rail (1353) of the first carrier (120).

As previously described, the second carrier (130) includes the driving magnet (M) to move it along the optical axis and the first carrier (120) includes the driving coil (C).

Therefore, once the operating drive (H) exerts control for application power of appropriate magnitude and direction to the driving coil (C), the second carrier (130) moves along the optical axis from the point of view of the first carrier (120), a fixed body in this case (A1 of FIG. 8). The second lens (70) moves along the optical axis as the second carrier (130) moves (A1 of FIG. 8).

In such case, the stopper structures (1237, 1257) and the moving space (S1, S2) provided by the first (1231) and second (1251) reception members of the first carrier (120), as illustrated in the lower half of FIG. 8, can prevent the second support (133) and the second guide (135) of the second carrier (130) from breaking away as well as delimit their range of movement within the designed range based on product specification, etc.

As previously described, the first carrier (120) moves, independently to the second carrier (130), along the optical axis (A2 of FIG. 8) through driving control by the motor drive (170) and physical support and guiding by the shaft (171). The first lens (60) attached to the first carrier (120) moves along the optical axis as the first carrier (120) moves (A2 of FIG. 8).

The second carrier (130) can be configured to move within a certain range through e.g., the stopper structures (1237, 1257) in conjunction with the physical movement of the first carrier (120) even when the first carrier (120) is allowed to move independently.

As previously described, the driving coil (C) and the Hall sensor (H) that drive the second carrier (130) are set up in the first carrier (120) which moves independently along the optical axis. In other words, the driving coil (C) and the Hall sensor (H) that drive the second carrier (130) are not set up on a body in absolute stationary state, but on an independently moving body.

As thus explained, the movement of the first carrier (120) causes the positional relationship between the Hall sensor (H) and the driving magnet (M) to change, and this change in turn alters the signal that the Hall sensor (H) outputs to the operating drive (H).

Accordingly, when power of suitable magnitude and direction in response to the altered signal is applied across the driving coil (C), this causes the second carrier (130) to move in conjunction with the movement of the first carrier (120) along the optical axis. Furthermore, such control processing allows the first (120) and second (130) carriers to sustain proper spacing even in the movement of the first carrier (120).

In other words, since the change in the signal output from the Hall sensor (H) is a function of the direction/magnitude of the first carrier's (120) movement, the movement of the second carrier (130) can be controlled to match the direction and magnitude of the first carrier's (120) movement by means of control through the operating drive (H) and the configuration described above.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

In the above description of this specification, the terms such as "first" and "second" etc. are merely conceptual terms used to relatively identify components from each other, and thus they should not be interpreted as terms used to denote a particular order, priority or the like.

The drawings for illustrating the present disclosure and its embodiments may be shown in somewhat exaggerated form in order to emphasize or highlight the technical contents of the present disclosure, but it should be understood that various modifications may be made by those skilled in the art in consideration of the above description and the illustrations of the drawings without departing from the scope of the present invention.

What is claimed is:

1. A hybrid zoom drive actuator comprising:
a first carrier having a first lens attached thereto;
a second carrier located anterior or posterior to the first carrier along the optical axis and having a second lens attached thereto;
a housing enclosing the first and second carriers;
a first driving unit capable of moving the first carrier along the optical axis;
a driving magnet attached to the second carrier;
a driving coil facing the driving magnet and capable of providing driving force to move the second carrier along the optical axis;
a Hall sensor capable of detecting the position of the second carrier; and
a first circuit board equipped with the driving coil and the Hall sensor,
wherein the first circuit board is mounted on the first carrier to move along the optical axis with the first carrier.

2. The hybrid zoom drive actuator according to claim 1,
wherein the actuator further comprises an operating drive capable of applying power to the driving coil, said power having a magnitude and a direction in response to the signal from the Hall sensor; and
wherein the operating drive, upon movement of the first carrier, controls the movement of the second carrier, said control being in response to the magnitude and direction of the movement of the first carrier.

3. The hybrid zoom drive actuator according to claim 1,
wherein the second carrier is placed within the moving space provided by the first carrier, and
wherein the first carrier comprises a stopper structure to delimit the scope of movement for the second carrier.

4. A hybrid zoom drive actuator comprising:
a first carrier having a first lens attached thereto;

a second carrier located anterior or posterior to the first carrier along the optical axis and having a second lens attached thereto;

a housing enclosing the first and second carriers;

a first driving unit capable of moving the first carrier along the optical axis;

a driving magnet attached to the second carrier;

a driving coil facing the driving magnet and capable of providing driving force to move the second carrier along the optical axis;

a Hall sensor capable of detecting the position of the second carrier; and a first circuit board equipped with the driving coil and the Hall sensor, wherein the second carrier comprises:

a second mount equipped with the second lens; and a second support fitted on the second mount, either left or right thereto and equipped with the driving magnet; said second support extending longer along the optical axis than the second mount, wherein the first carrier comprises a first mount equipped with the first lens;

a first support fitted on the first mount, either left or right thereto and having a first reception member to provide the moving space for the second support; said first support being equipped on the exterior thereof with the first circuit board, and a first guide formed on a side of the first mount, either the left or right thereof, but opposite the side the first support is fitted thereon, and wherein either the first support or the first guide is physically connected to the first driving unit.

5. The hybrid zoom drive actuator according to claim 4, wherein the first support extends along the optical axis longer than the first mount in a direction running opposite to the second support.

6. The hybrid zoom drive actuator according to claim 4, wherein the second carrier further comprises a second guide formed on a side of the second mount, either the left or right thereof, but opposite the side the second support is fitted thereon, and the first guide of the first carrier comprises a second reception member to provide the moving space for the second guide.

7. The hybrid zoom drive actuator according to claim 6, wherein first carrier comprises a first guide rail formed on the first support and facing a first concave rail formed on the second support; and a second guide rail formed on the first guide and facing a second concave rail formed on the second guide; and wherein the one out of the first support and the first guide that is not physically connected to the first driving unit further comprises a grooved rail facing a guide rail formed on the housing; and a plurality of balls; with at least one of said plurality of balls positioned between the guide rail and the grooved rail; between the first guide rail and the first concave rail;

and between the second guide rail and the second concave rail.

* * * * *